June 25, 1957     H. KERSHAW     2,797,303
METHOD OF AND APPARATUS FOR PRODUCING
HERMETICALLY SEALED CARTRIDGES
Filed Oct. 19, 1955     2 Sheets-Sheet 1

INVENTOR.
Henry Kershaw

BY     ATTORNEY

June 25, 1957

H. KERSHAW 2,797,303

METHOD OF AND APPARATUS FOR PRODUCING
HERMETICALLY SEALED CARTRIDGES

Filed Oct. 19, 1955

2 Sheets-Sheet 2

INVENTOR.
Henry Kershaw

BY *B.P. Johnson*

ATTORNEY

United States Patent Office 2,797,303
Patented June 25, 1957

2,797,303

METHOD OF AND APPARATUS FOR PRODUCING HERMETICALLY SEALED CARTRIDGES

Henry Kershaw, Belleville, N. J.

Application October 19, 1955, Serial No. 541,357

18 Claims. (Cl. 219—117)

My invention relates to a method of and apparatus for producing hermetically sealed cartridges for transistors or crystal diodes.

An important object of the invention is to provide means for welding together the parts of the cartridge while maintaining the interior of the cartridge at a relatively low temperature.

A further object of the invention is to provide means for cooling the cartridge holding unit during the welding step.

A further object of the invention is to provide yielding means to permit proper contact of the several contacting elements of the apparatus.

A further object of the invention is to provide means which will permit of the convenient introduction of the cartridge element into the electrode and the introduction of an inert gas into the cartridge element.

A further object of the invention is to provide means for holding the inert gas in the presence of the parts being welded, both interiorly and exteriorly of the same.

A further object of the invention is to provide means to cause the welding pressure applied to the plasticized parts being welded to follow through during the welding period and to permit of ejecting the finished product.

Other objects and advantages of the invention will be apparent during the course of the following description.

Figure 1:
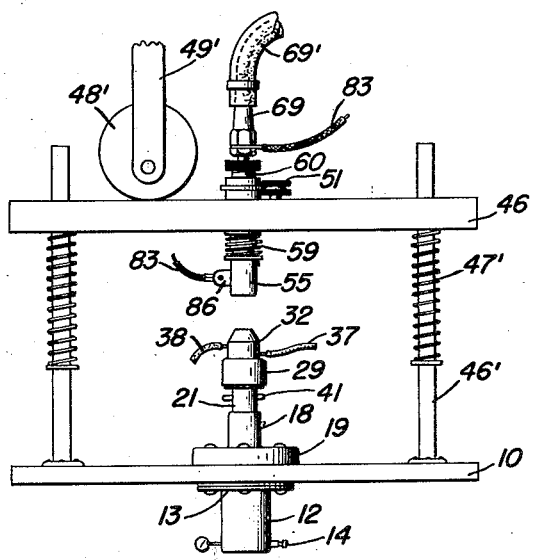
Figure 4:
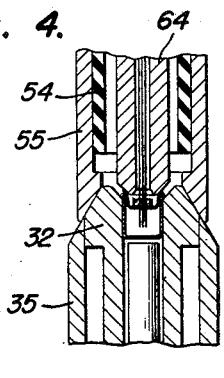
Figure 5:
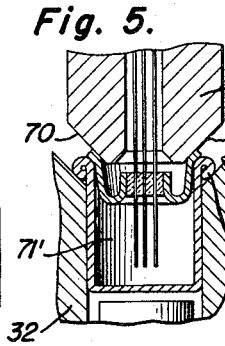
Figure 6:
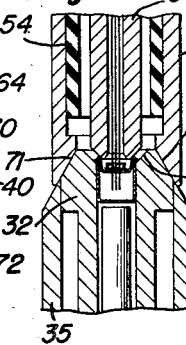
Figure 7:
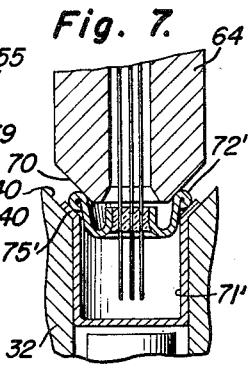
Figure 8:
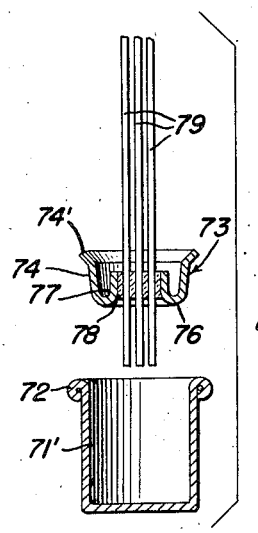
Figure 9:
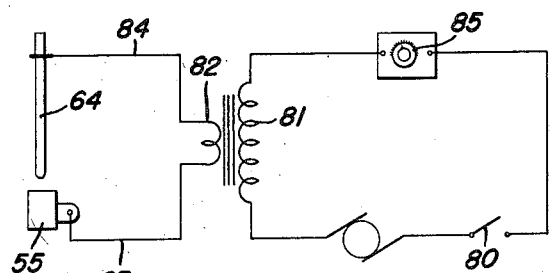
Figure 2:
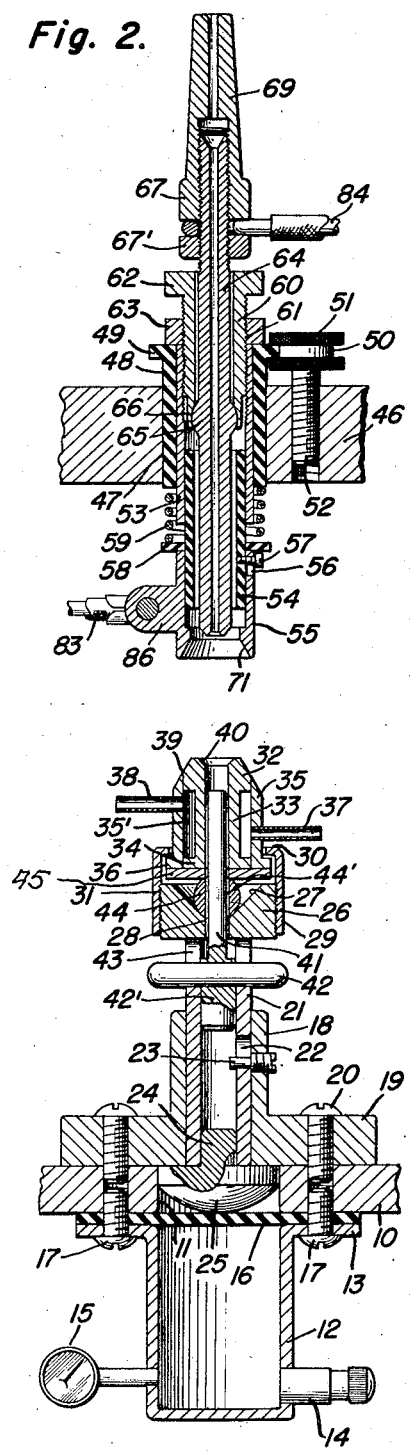
Figure 3:
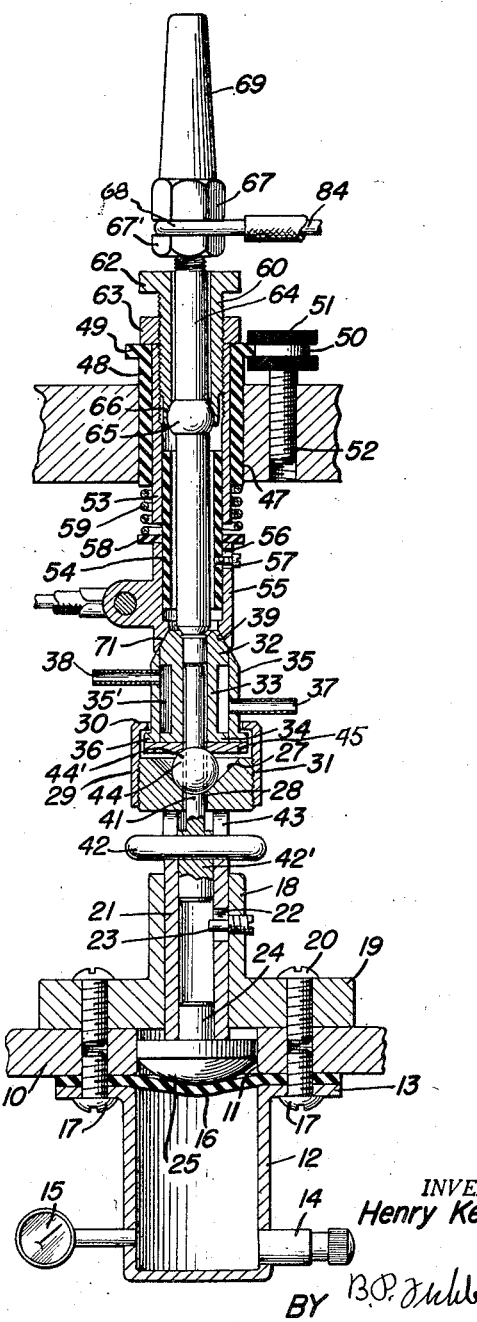

In the accompanying drawings forming a part of this application and in which like numerals are employed to designate like parts throughout same, Figure 1 is a side elevation of apparatus embodying my invention, showing the same in the open position, Figure 2 is a central vertical longitudinal section through the same, parts broken away, showing the upper unit in the raised or opened position, Figure 3 is a similar view showing the upper unit in the lowered position and the tubular electrical conductor and associated elements depressing the lower tubular electrode, Figure 4 is a similar view, upon an enlarged scale, through the tubular electrical conductor and associated electrodes, parts broken away, showing the assembled cartridge inserted within the lower tubular electrode, Figure 5 is a similar view, upon a further enlarged scale, through the electrodes, parts broken away, showing the assembled parts of the cartridge inserted within the lower tubular electrode, Figure 6 is a view similar to Figure 4, showing a modified form of assembled cartridge held within the lower tubular electrode, Figure 7 is a similar further enlarged view, corresponding to Figure 5, showing the modified form of cartridge held within the lower tubular electrode, Figure 8 is a central vertical longitudinal section upon an enlarged scale, through the elements of the cartridge, separated for the purpose of illustration, and, Figure 9 is a diagrammatic view showing the welding circuit.

In the drawings, where for the purpose of illustration is shown a preferred embodiment of my invention, the numeral 10 designates a fixed horizontal support having an opening 11 therein. The numeral 12 designates a cylinder closed at its bottom and having an open top and provided with a flange 13. The cylinder is equipped with a valve 14 which may be similar to the valve used on an automobile tire. Air is pumped into the cylinder 12 through the valve 14 and the air pressure in the cylinder 12 is held at the selected point. This pressure is indicated by a gauge 15 connected with the cylinder 12. The top of the cylinder 12 is covered by a flexible diaphragm 16, which is elastic and is tensioned so that it is biased for upward movement. This diaphragm is held in place by the flange 13 which is secured to the support 10 by screws 17, as shown.

Mounted upon the support 10 is a vertical sleeve 18, rigidly secured to a horizontal flange 19, rigidly secured to the support 10 by screws 20. Mounted to slide within the sleeve 18 is a vertical tubular stem 21, having a longitudinal slot 22, receiving a pin 23 fixed to the sleeve 18, and this pin limits the vertical reciprocatory movement of the tubular stem 21. The tubular stem 21 extends to the opening 11 and receives therein a shank 24, carried by a plunger 25, which is arranged above and bears against the elastic diaphragm. When the tubular stem 21 is in the raised position, Figure 2, the diaphragm 16 is substantially horizontal, and this diaphragm will urge the stem 21 to the raised position, when downward pressure is not applied to the tubular stem.

Rigidly mounted upon the upper end of the tubular stem 21 and preferably formed integral therewith is a socket 26 and this socket has a recess 27 formed therein which is conical and tapers downwardly and the lower end of the recess 27 leads into a vertical opening 28. A sleeve 29 is provided having at its top an inturned flange 30. This sleeve receives the socket 26 and may be secured thereto by any suitable means, such as screw-threads 31.

The numeral 32 designates a lower outer tubular electrode, formed of metal and also formed integral with a tubular body portion 33, provided at its lower end with a flange 34, as shown. Surrounding the tubular electrode 32, tubular body portion 33 and flange 34 is a jacket 35 forming a wall space 35'. The jacket 35 is rigidly secured to the tubular electrode 32 and flange 34 by any suitable means. The jacket 35 is provided at its lower end with a flange 36, arranged beneath the flange 30 and positioned within the sleeve 29. The flange 36 has a smaller exterior diameter than the interior diameter of the sleeve 29, to permit of a limited universal or floating movement of the electrode 32. A cooling medium, such as water, is supplied to the jacket 35 through a pipe 37 and is discharged from this jacket through a pipe 38.

At its upper end, the lower tubular electrode 32 is exteriorly tapered, as shown at 39 and this taper is preferably thirty degrees from the vertical. The electrode 32 is also provided with an internal taper 40, which is preferably forty-five degrees from the vertical. The taper 39 decreases upwardly and the taper 40 decreases downwardly.

Mounted to reciprocate within the opening 28 and the tubular electrode 32 is an ejector plunger 41, having an exterior diameter which is considerably smaller than the internal diameter of the opening 28 and the bore of the tubular electrode 32. This ejector plunger extends downwardly beyond the socket 26 and is rigidly connected with a piston 42' slidable within the tubular stem 21, and carrying a transverse handle 42, operating within elongated slots 43, formed in the tubular stem. The numeral 44 designates a ball seated for rolling action within the conical recess 27. This ball has a diametrically extending opening 44', formed therein, slidably receiving the ejector plunger 41. The opening 44' has an internal diameter larger than the exterior diameter of the ejector plunger 41. The ball 44 seats against the wall of the conical recess 27 and a disc 45 is arranged above the ball and rests upon the same and the disc bears against the flange 34. This disc has a central opening to receive the ejector plunger 41 and this central opening has an interior diameter considerably larger than the exterior diameter of the ejector plunger, and the exterior diameter of the disc 45 is considerably smaller than the interior diameter of the sleeve 29. Since the flange 36 has an exterior diameter smaller than the internal diameter of the sleeve 29, and since the same is true of the disc 45, and since the ejector plunger has a smaller diameter than the opening 28 and the bore of the tubular electrode 32 and the opening in the disc 45, and since there is sufficient space between the flange 36 and flange 30, the tubular electrode 32 is supported in a manner to have floating action within limits.

The tubular electrode 32 is of course insulated from the source of welding current, and for this purpose the support 10 may be formed of wood or insulating material or any other means may be employed to suitably insulate the electrode 32.

Arranged above the outer tubular electrode 32 and associated elements is a horizontal support 46, slidably mounted upon vertical posts 46', and moved upwardly by springs 47'. The support 46 is moved downwardly a selected distance and then held in the lowered position by any suitable means such as a cam 48', mounted upon a fixed support 49'. The support 46, Figures 2 and 3, is provided with a vertical opening 47, slidably receiving an insulating sleeve 48 having a horizontal flange 49 at its top, to engage within an annular groove 50 formed in the head 51 of a screw 52, engaging within an opening formed in the support 46. By turning the head 51, the sleeve 48 may be vertically adjusted with respect to the support 46. Mounted within the insulating sleeve 48 is a vertical metal sleeve 53, held stationary therein by any suitable means such as by having a press fit therein. Mounted within the lower end of the metal sleeve 53 is a lower insulating sleeve 54, held stationary therein by means of a press fit or the like. Slidably mounted upon the lower end of the insulating sleeve 54 is a tubular metal conductor 55, having a longitudinal slot 56 formed therein for receiving a stop screw 57, carried by the insulating sleeve 54 to limit the longitudinal movement of the tubular metal conductor. Arranged above the upper end of the tubular conductor 55, is an insulating ring 58, slidable upon the sleeve 54 and bearing against the upper end of the tubular conductor 55. The insulating ring 58 is forced downwardly by a compressible coil spring 59 engaging the lower end of the insulating sleeve 48. The spring 59 tends to shift the tubular conductor 55 downwardly and will permit of its relative upward movement.

An adjustable metal sleeve 60 has screw-threaded engagement within the upper portion of the metal sleeve 53, as shown at 61. This sleeve 60 is provided at its upper end with a knurled head 62 so that it may be turned, to longitudinally adjust the sleeve 60 with respect to the sleeve 53 and the sleeve 60 is locked in the selected adjusted position by means of a lock nut 63.

The numeral 64 designates an inner tubular electrode, which extends through the sleeve 60 and sleeve 54 and is provided with a spherically curved enlargement or ball 65, which is mounted to turn within a spherically curved recess 66, formed in the lower end of the sleeve 60. The tubular electrode 64 is of course made of metal and has an exterior diameter smaller than the bores of the sleeves 60 and 54, and is therefore mounted to have a floating action, within limits. It may turn upon its longitudinal axis or it may be swung in any direction. The tubular electrode 64 projects above the head 62 and has a screw-threaded portion receiving nuts 67, 67' for clamping engagement with the terminal 68 which may be apertured to receive the tubular electrode. This terminal is electrically connected with one side of the welding circuit, as will be further described. The tubular electrode 64 extends above the nut 67 and has screw-threaded engagement with a tubular nipple 69, to be connected with a hose 69', which supplies inert gas under pressure through the tubular electrode. This gas may be nitrogen.

The lower end of the inner tubular electrode 64, Figures 5 and 7, is inclined or beveled as shown at 70, and this inclination is at forty-five degrees from the vertical and is parallel with the inclined portion 40. The lower end of the tubular conductor 55 is inclined or beveled as shown at 71 and this inclined portion is parallel with the inclined or tapered portion 39.

The hermetically sealed cartridge comprises a metal casing or shell 71', Figures 4, 5 and 8, preferably formed of "Kovar" which is an alloy which will seal or attach to glass. This shell or casing 71' is cup-shaped and is preferably cylindrical and is closed at its bottom and open at its top. The shell 71' may have an exterior diameter of about three-sixteenths of an inch, although it may vary widely as to this diameter. The open free end of the shell or casing 71', Figures 5 and 8, is formed or curled to provide an exterior bead or flange 72, which is circular in cross section. The hermetically sealed cartridge includes a cap 73 including an outer cylindrical portion 74 carrying an outwardly flaring flange 74', arranged at forty-five degrees from the vertical. At its lower end, the outer portion 74 is bent or formed at 76 to provide an inner cylindrical portion 77, spaced from the portion 74, and receiving a glass bead 78, having lead wires 79 embedded therein. The portion 77 is tubular and open at both ends. The cap 73 is formed of "Kovar" so that it may readily fuse or attach to the glass bead 78, and also so that the same alloy may be employed in the cap for ready welding to the casing 71'. The element 71' and 73 may be formed of any suitable metal or alloy which will readily weld together and will readily attach to glass.

The operation of the apparatus is as follows:

When the carriage or support 46 is in the raised position, the tubular conductor 55 is in the raised position with respect to the outer tubular electrode 32, but is in the lowermost position with respect to the sleeve 54, Figure 2. This spaces the tubular conductor 55 from the tubular electrode 32 and the inner tubular electrode 64 has its lower and at a selected elevation with respect to the tubular conductor 55. There is therefore ample space between the tubular conductor 55 and the lower electrode 32 so that the operator may introduce the shell 71' into the upper end of the tubular electrode 32. The cap 73 is not now in place upon the shell. The bead 72 will contact with a tapered face 40 of the electrode 32. The inert gas such as nitrogen is now supplied through the tubular electrode 64 and discharges from the lower end thereof and enters the shell 71' and displaces the air therefrom and the shell becomes filled with the inert gas. The supply of nitrogen is not cut off and the cap 73 is now applied to the upper end of the shell 71' and is inserted therein and its flange 74' will contact with the bead 72. This cap carries the glass bead 78 having the lead wires 79 embedded therein and these lead wires extend into the shell 71' and also into the lower end of the tubular electrode 64. The inert gas is still being discharged from the lower end of the tubular electrode 64. With the parts of the cartridge thus assembled, the carriage 46 is moved downwardly for a selected distance while operating the cam 48', and is then held in the lowered position. When the carriage 46 descends, the tubular conductor 55 will first contact with the inclined face 39 and its downward movement is then stopped. When the tubular conductor 55 has its downward movement arrested, the spring 59 is compressed, insuring a firm contact between the elements 55 and 32, and the inner tubular electrode 64 continues to move downwardly until its inclined end 70 contacts with the inclined flange 74', thus pressing the flange 74' against the bead 72, for effecting a welding contact. The downward movement of the inner tubular electrode 64 and the tubular conductor 55 moves the lower tubular electrode 32 downwardly in opposition to the air pressure in the cylinder 12, as shown in Figure 3. The air pressure within the cylinder 12 acting upon the diaphragm 16 provides a yielding and resilient force opposing the downward movement of the electrode 32 and therefore retains electrodes 32 and 64 in firm contact with the parts to be welded, and when the welding occurs, as will be described, this pressure will instantly move the electrode 32 upwardly, thus causing the pressure to follow through during the welding process.

When the electrodes 32 and 64 engage and press against the work, the welding circuit is closed by closing a switch 80 and the circuit is made through the primary coil 81 and a step down circuit is induced into secondary coil 82. The current passes from the coil 82 through wire 83, tubular conductor 55, electrode 32, through the work, through the electrode 64 and through wire 84, back to the coil 82. The welding time is controlled by means of a timer 85, and the welding is continued for about two cycles. The wire 84 is connected with the electrode 64 by the clamping nuts 67. Wire 83 is electrically connected with the tubular conductor 55 by means of a clamp 86 carried by the tubular conductor 55. By having both wires carried by the upper unit, they are out of the way and do not interfere with introducing the work into the tubular electrodes.

During the welding step, the interior of the lower tubular electrode and the shell 71' have their temperatures retained low, and it is desirable that the temperature within the shell 71' will not rise above 100° C.

After the completion of the welding, the upper unit including the electrode 64 is returned to the raised position, and the handle 42 is raised so that the ejector plunger 41 removes the finished product from within the outer tubular electrode.

As core clearly shown in Figure 5, the pressure from the inclined faces 70 and 40 is applied to the parts being welded at an angle of forty-five degrees from the vertical, while the electrode 64 is moved downwardly in a vertical direction.

I also contemplate forming a bead 72' upon the cap 73 instead of the flange 74' and to form a flange 75' upon the shell 71' instead of the bead 72. This is shown in Figure 7. The welding process is the same as described in connection with the first form of the invention.

It is to be understood that the forms of my invention herewith shown and described are to be taken as preferred examples of the same and that various changes in the shape, size and arrangement of parts may be resorted to, without departing from the spirit of my invention or the scope of the subjoined claims.

Having thus described my invention, I claim:

1. Apparatus for producing a hermetically sealed cartridge for transistors or the like, comprising an outer tubular electrode for receiving a metallic shell, the metallic shell receiving upon its open end a cap carrying lead wires, an inner tubular electrode having its free end arranged to engage with said cap and press the same against said shell to produce a clamping action between parts of the same, the lead wires extending into the inner tubular electrode, means to effect a relative axial movement between the electrodes, means to apply a welding current to the contacting parts while subjected to clamping engagement, and means connected with the inner tubular electrode to supply an inert gas into the inner tubular electrode.

2. Apparatus for producing a hermetically sealed cartridge for transistors or the like, comprising an outer tubular electrode for receiving a metallic shell, an inner tubular electrode having a part to engage a cap applied to the metallic shell and cause the same to have clamping engagement with said shell, a jacket surrounding the outer tubular electrode for holding a cooling medium, a pneumatic device acting against the outer tubular electrode so that the parts follow through during the welding period, means to effect a relative axial movement between said electrodes, and means to apply a welding current to said electrodes.

3. Apparatus for producing a hermetically sealed cartridge for transistors or the like which comprise a metallic shell and metallic cap, comprising an electrode for engagement with said shell, a co-acting electrode for engagement with said cap, supporting means carrying the co-acting electrode, a metallic conducting shell carried by the supporting means and arranged to engage with the first-named electrode, and means to move the supporting means to move the co-acting electrode toward and from the first-named electrode, and a welding circuit connected with the metallic conducting sleeve and the co-acting electrode.

4. Apparatus for producing a hermetically sealed cartridge for transistors or the like which include a metallic shell and a metallic cap, comprising an electrode for engagement with said shell, a co-acting electrode for engagement with said cap, supporting means carrying the co-acting electrode, a metallic conductor sleeve carried by the supporting means and movable with relation thereto, yielding means to move the metallic conducting sleeve forwardly with respect to the supporting means, the metallic conducting sleeve projecting forwardly beyond the co-acting electrode to contact with the first-named electrode before the co-acting electrode contacts with said cap, and means to move the supporting means toward and from the first-named electrode.

5. Apparatus for producing a hermetically sealed cartridge for transistors or the like which include a metallic shell and metallic cap, comprising an electrode for engagement with said shell, a tubular electrode for engagement with said cap, supporting means carrying the tubular electrode, a metallic conducting sleeve carried by the supporting means and movable with relation thereto and arranged to engage the first-named electrode, yielding means to urge the metallic conducting sleeve forwardly, the metallic conducting sleeve projecting forwardly beyond the tubular electrode to contact with the first-named electrode before the tubular electrode contacts with the cap, means to move the supporting means toward and from the first-named electrode, means to supply an inert gas to the tubular electrode, and a welding circuit connected with the metallic conducting sleeve and tubular electrode.

6. Apparatus for producing a hermetically sealed cartridge for transistors or the like which include a metallic shell and metallic cap, comprising a first tubular electrode for receiving said shell, a movable ejector plunger mounted within the tubular electrode for removing said shell, a cooling jacket carried by the tubular electrode, a second tubular electrode to engage with said metallic cap, and supporting means carrying the second tubular electrode and movable toward and from the first tubular electrode, said electrodes being adapted for connection with a welding circuit.

7. Apparatus for producing a hermetically sealed cartridge, comprising a first electrode, means for supporting the first electrode comprising pneumatic means, a second tubular electrode arranged near the first electrode, means connected with the second tubular electrode near its outer end to supply an inert gas into the second tubular electrode, supporting means for the second tubular electrode movable toward and from the first electrode, said electrodes being adapted for connection with a welding circuit.

8. Apparatus for producing a hermetically sealed cartridge, comprising a first electrode, a movable support for the first electrode, resilient pneumatic means moving the support in one direction, a universal connecting means between the first electrode and the movable support, a second electrode arranged near the first electrode, supporting means for the second electrode and movable toward and from the first electrode, and a universal connecting means between the second electrode and said supporting means.

9. Apparatus for producing a hermetically sealed cartridge, comprising a first electrode, supporting means movable toward and from the first electrode, a tubular device mounted upon the supporting means, a spherically curved socket arranged within the tubular device, a second electrode having a spherically curved portion movably mounted within the said socket, the second electrode being arranged within and spaced from the tubular device, a conductor sleeve longitudinally movably mounted upon the tubular device and arranged near the forward end of the second electrode to engage with the first electrode, resilient means to move the tubular conductor sleeve forwardly, and means for connecting the conductor sleeve and second electrode with a welding circuit.

10. Apparatus for producing a hermetically sealed cartridge, comprising supporting means including a member having a conical recess, a first electrode mounted upon said member, a ball arranged within the conical recess beneath the first electrode to support it, the first electrode having a limited floating action, a second support movable toward and from the first supporting means, a spherically curved socket carried by the second support, a second electrode having a spherically curved portion mounted within said socket, and means for connecting said electrodes with a welding circuit.

11. Apparatus for producing a hermetically sealed cartridge, an outer substantially vertical electrode, said electrode being provided with an outer inclined face and an inner face inclined substantially forty-five degrees from the vertical, a substantially vertical inner electrode having an outer face inclined substantially forty-five degrees from the vertical, a conductor sleeve surrounding the inner electrode and having an inner inclined face, the inner inclined face of the conductor sleeve being adapted to engage with the outer inclined face of the outer electrode, means for supporting said electrodes so that they are capable of partaking of a limited universal floating action and to effect a relative opening and closing movement between said electrodes.

13. Apparatus for producing a hermetically sealed cartridge for transistors or the like which includes a metallic shell and metallic cap, comprising a first tubular electrode for receiving said shell, a second tubular electrode to engage with said cap, supporting means carrying the second tubular electrode and movable toward and from the first tubular electrode, said supporting means including a sleeve surrounding the second tubular electrode and adapted to engage with the first tubular electrode exteriorly of the shell held within the first tubular electrode for forming a substantially gas tight joint therewith, means connected with the second tubular electrode to supply an inert gas to the interior of the same, and means for electrically connecting a welding circuit with said electrodes.

13. Apparatus for producing a hermetically sealed cartridge for transistors or the like which include a metallic shell and a metallic cap, comprising a first tubular electrode for receiving said shell, a second tubular electrode to engage with said cap, supporting means carrying the second tubular electrode and movable toward and from the first tubular electrode, said supporting means including a sleeve surrounding the second tubular electrode and adapted to engage with the first tubular electrode exteriorly of the shell within the first tubular electrode, means connected with the second tubular electrode to supply an inert gas to the interior of the same, resilient means supporting the first tubular electrode to move the first tubular electrode toward the second tubular electrode, and a welding circuit connected with said electrodes.

14. Apparatus for producing a hermetically sealed cartridge for transistors or the like which include a metallic shell and a metallic cap, comprising a first tubular electrode for receiving said shell, resilient means supporting the first tubular electrode, a second tubular electrode to engage with said cap, supporting means carrying the second tubular electrode and movable axially of the first and second tubular electrodes to shift the second tubular electrode toward and from the first tubular electrode, means connected with the second tubular electrode to supply an inert gas to the interior of the same so that said gas may be supplied adjacent to the point of welding, an ejector mounted within the first tubular electrode, and a welding circuit connected with said electrodes.

15. Apparatus for producing a hermetically sealed cartridge for transistors or the like which include a metallic shell and a metallic cap, comprising a first tubular electrode for receiving said shell, resilient means supporting said first tubular electrode, a second tubular electrode to engage with said cap, supporting means carrying the second tubular electrode and movable toward and from the first tubular electrode, said supporting means including a sleeve surrounding the second tubular electrode and projecting forwardly beyond the same to engage with the first tubular electrode exteriorly of the shell within the first tubular electrode, said sleeve being movable with relation to the supporting means, resilient means to oppose the relative movement of the sleeve in one direction, means connected with the second tubular electrode to supply an inert gas to the interior of the same, a jacket surrounding the first tubular electrode for receiving a cooling medium, and a welding circuit connected with said electrodes.

16. A method of producing a hermetically sealed cartridge for transistors or the like, comprising forming a tubular bead upon a metallic shell near the open end of the shell and extending the tubular bead circumferentially around the shell and leaving the bore of the tubular bead empty so that the tubular bead is flexible and will be flexed when subjected to a suitable pressure, taking a metallic cap having a marginal portion extending circumferentially of the cap and arranging the marginal portion and flexible tubular bead in opposed relation and in contact with each other, applying pressure to the marginal portion and flexible tubular bead to bring them into clamping engagement and thereby flexing the flexible tubular bead so that the marginal portion and the flexible tubular bead will contact continuously throughout the circumference of the flexible tubular bead, and applying welding current to the marginal portion and flexible tubular bead while they are subjected to the clamping action.

17. A method of producing a hermetically sealed cartridge for transistors or the like, comprising holding a metallic shell having an open end, forming a tubular bead upon a metallic cap and extending the tubular bead circumferentially of the metallic cap and leaving the bore of the tubular bead empty so that the tubular bead is flexible and is fixed when subjected to suitable pressure, arranging the metallic cap within the open end of the metallic shell and arranging the flexible tubular bead in opposed relation to the end portion of the metallic shell, applying pressure to the end portion of the metallic shell and flexible tubular bead to bring them into clamping engagement and thereby flexing the flexible tubular bead so that the end portion of the shell and flexible tubular bead will contact continuously throughout the circumference of the flexible tubular bead, and applying a welding current to the end portion of the shell and the flexible tubular bead while they are subjected to the clamping action.

18. A method of producing a hermetically sealed cartridge for transistors or the like which cartridge includes metallic parts to be secured together, said method comprising forming a substantially annular tubular bead upon one metallic part and leaving the bore of the tubular bead empty so that the tubular bead is flexible when subjected to suitable pressure, arranging the other metallic part and flexible tubular bead in opposed relation and in contact with each other, applying pressure to said other part and flexible tubular bead to bring them into clamping engagement and thereby flexing the flexible tubular bead so that said other part and flexible tubular bead will contact continuously throughtout the circumference of the substantially annular flexible tubular bead, and applying a welding current to said other part and flexible tubular bead while they are subjected to the clamping action.

References Cited in the file of this patent

UNITED STATES PATENTS

| | | |
|---|---|---|
| 632,505 | Williamson | Sept. 5, 1899 |
| 1,538,590 | Randles | May 19, 1925 |
| 1,569,323 | Hoffer | Jan. 12, 1926 |
| 2,015,193 | Reed | Sept. 24, 1935 |
| 2,101,156 | Payne | Dec. 7, 1937 |
| 2,145,276 | Pfanstiehl | Jan. 31, 1939 |
| 2,166,830 | Thorson | July 18, 1939 |
| 2,316,597 | Kershaw | Apr. 13, 1943 |
| 2,319,407 | Knochel et al. | May 18, 1943 |
| 2,360,660 | Eaton et al. | Oct. 17, 1944 |
| 2,397,263 | Hunter et al. | Mar. 26, 1946 |
| 2,481,042 | Tomasek et al. | Sept. 6, 1949 |

FOREIGN PATENTS

| | | |
|---|---|---|
| 700,691 | Germany | Dec. 27, 1940 |
| 951,480 | France | Apr. 18, 1949 |